United States Patent [19]

Park

[11] Patent Number: 5,635,820
[45] Date of Patent: Jun. 3, 1997

[54] BATTERY CHARGING CONTROL DEVICE AND METHOD FOR ACCURATELY DETECTING A CHARGING END STATE

[75] Inventor: Hae-Woo Park, Ulsan-shi, Rep. of Korea

[73] Assignee: Hyundai Motor Company, Seoul, Rep. of Korea

[21] Appl. No.: 491,222

[22] Filed: Jun. 16, 1995

[30] Foreign Application Priority Data

Jun. 16, 1994 [KR] Rep. of Korea .................. 94-13616

[51] Int. Cl.[6] .................. H01M 10/44; H01M 10/46
[52] U.S. Cl. .................. 320/30; 320/35; 320/39; 320/31; 324/427
[58] Field of Search .................. 320/5, 30, 31, 320/35, 36, 39, 40, 48; 324/427, 431, 433; 340/636; 429/61, 90

[56] References Cited

U.S. PATENT DOCUMENTS

| | | | |
|---|---|---|---|
| 4,829,226 | 5/1989 | Nakamura et al. | 320/35 |
| 5,122,722 | 6/1992 | Goedken et al. | 320/35 X |
| 5,166,596 | 11/1992 | Goedken | 320/35 |
| 5,245,268 | 9/1993 | Wang | 320/35 |
| 5,477,127 | 12/1995 | Shiojima et al. | 320/35 |

*Primary Examiner*—Edward Tso

[57] ABSTRACT

The present invention discloses a controlling device and a method for charging a battery for an electric vehicle which improves the battery consumption ratio and its stability. The charge controlling device includes a battery temperature sensing member, a battery voltage sensing member, a current sensing member, a charging mode switch, a charge control device. When the predetermined charging mode is a constant current/constant voltage method, if the battery temperature is above the maximum predetermined temperature, a charging end signal is produced. If the battery temperature is below the minimum predetermined temperature, the full-charging state is determined in accordance with the measured current value and the charging end signal is produced. On the other hand, when the predetermined charging mode is a constant current charging mode, if the battery temperature is below the minimum predetermined temperature, the battery voltage drop state is determined. IF the battery voltage drop occurs below the predetermined voltage, the charging end signal is produced in accordance with the charging limit time, and a battery charging member.

28 Claims, 3 Drawing Sheets

BATTERY CHARGING CONTROL DEVICE AND METHOD FOR ACCURATELY DETECTING A CHARGING END STATE

BACKGROUND OF THE INVENTION

1. Field of the Invention

The present invention relates to a controlling device and a method for charging a battery for an electric vehicle. More particularly, the present invention relates to a controlling device and a method for charging a battery for an electric vehicle that may finish charging by sensing a full-charging state of the battery.

2. Description of the Related Art

Generally, an electric vehicle is an electric motor-driven-engine different from the general vehicle using gasoline or gas. It may adequately cope with exhaust gas regulations of every country which protect against environmental pollution because it does not emit exhaust gas.

In the electric vehicle, the second battery supplying continuous power so as to drive an engine can be used semipermanently by recharging.

However, in charging the battery, when a charging current continuously flows into the battery despite the full-charging state, a negative characteristic occurs.

Specifically, the battery voltage reduces, and the durability and efficiency of the battery deteriorates, because of a large amount of heat generated in the battery.

In a conventional technique, to solve the above problem, if the battery is fully charged, charging will be completed by detecting a charging end state of the battery in accordance with each charging method.

In the general method of charging the battery, there are a constant current charging method and a constant current/constant voltage charging method.

In the above constant current charging method, the charging end state is generally sensed by a temperature cut-off (TCO) method, a flat time limiting method and a voltage drop (- V) method.

As to the TCO method, since it is dangerous for the temperature of the battery to be raised excessively in the constant current charging, the TCO method controls charging the battery in accordance with the charging limit temperature determined by the specification on the charging limit temperature provided by a manufacturing company. In this method, it is desirable to determine the charging limit temperature considering that if the temperature of the battery is high, the efficiency of the charging battery is improved.

As to the voltage drop (- V) method, in the constant current charging, the battery produces the maximum voltage and causes the voltage drop phenomenon by rejoining with the internal gas. In this method, charging the battery is controlled by the optimum voltage drop value obtained by experiment.

As to the flat time limiting method, in the constant current charging, when the voltage drop value is not detected because it is sensitive to environmental circumstances, a detection limit time of the voltage drop value is determined in case charging should continue. When the voltage drop value is not detected during the above detection limit time of the voltage drop value, charging of the battery will be finished.

In the constant current/constant voltage charging method, the TCO method and a charging current limit method are generally used for sensing the charging state of the battery.

As to the above charging current limit method, after a predetermined current is charged in the constant current charging mode, if the constant current charging mode is transformed into the constant voltage charging mode, a great amount of charging current flows initially. However, as time goes by, the charging current is reduced. In this case, if the charging current is less than a particular value, charging the battery will be finished.

As described above, the conventional methods for sensing the charging end state are separately used. Therefore, when the temperature, the current and the voltage applied to each method are not sensed, the durability and efficiency of the battery is deteriorated because the charging end state is not accurately sensed.

SUMMARY OF THE INVENTION

To solve the above conventional technical problems, it is an object of the present invention to provide a controlling device and a method for charging a battery for an electric vehicle that may improve the battery consumption ratio and its stability by sensing a charging end state in accordance with a charging temperature, a charging voltage and a current of its charging/discharging as a result of collectively applying all methods capable of sensing the charging end state.

To achieve the objects, a controlling device for charging a battery for an electric vehicle, as embodied and broadly described herein, includes:

battery temperature sensing means for sensing the temperature of a battery, converting the temperature into an electric signal and producing the signal;

a battery voltage sensing means for sensing the charging voltage of the battery, converting the charging voltage into an electric signal and producing the signal;

current sensing means for measuring a current in charging/discharging of the battery and producing the corresponding electric signal;

a charging mode switch for determining the charging mode of the battery;

charge control means, when the predetermined charging mode is a constant current/constant voltage method, in case of the battery temperature is above the maximum predetermined temperature, producing a charging end signal, in case the battery temperature is below the minimum predetermined temperature, for determining the full-charging state in accordance with the measured current value and producing the charging end signal, on the other hand, when the predetermined charging mode is a constant current charging mode, in case of the battery temperature is below the minimum predetermined temperature, for determining the battery voltage drop state, in case of the battery voltage drop occurs below the predetermined voltage, for producing the charging end signal in accordance with the charging limit time; and battery charging means for carrying out the charging operation of the battery in accordance with the signal from the charge control means.

According to another aspect of the present invention, the method for controlling a battery charging for an electric vehicle includes:

initializing all operation circuits and using variables and determining a predetermined charging mode when power is applied to a vehicle;

when the predetermined charging mode is a constant current/constant voltage method, finishing charging by considering a state as the full-charging state in case a battery temperature is above the predetermined one and then measuring a battery current in case the battery temperature is below the predetermined temperature;

when the measured current is less than the predetermined current, finishing charging by determining that the battery is fully charged, converting the constant current charging into the constant voltage charging and reducing the current;

when the predetermined charging mode is a constant current method, sensing the battery temperature and finishing charging in case the battery temperature is above the predetermined temperature and measuring the battery voltage in case the battery temperature is below the predetermined temperature;

obtaining a voltage drop value which is the difference between the above measured voltage and the voltage measured in a former routine, finishing charging by determining the full-charging state when the above calculated voltage drop value is more than the reference voltage and measuring the battery charging time when the calculated voltage drop value is less than the reference voltage; and determining the full-charging state of the battery by measuring the battery temperature when the above measured charging time does not exceed the predetermined charging limit time and finishing charging by determining the full-charging state when the measured charging time exceeds the predetermined charging limit time.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
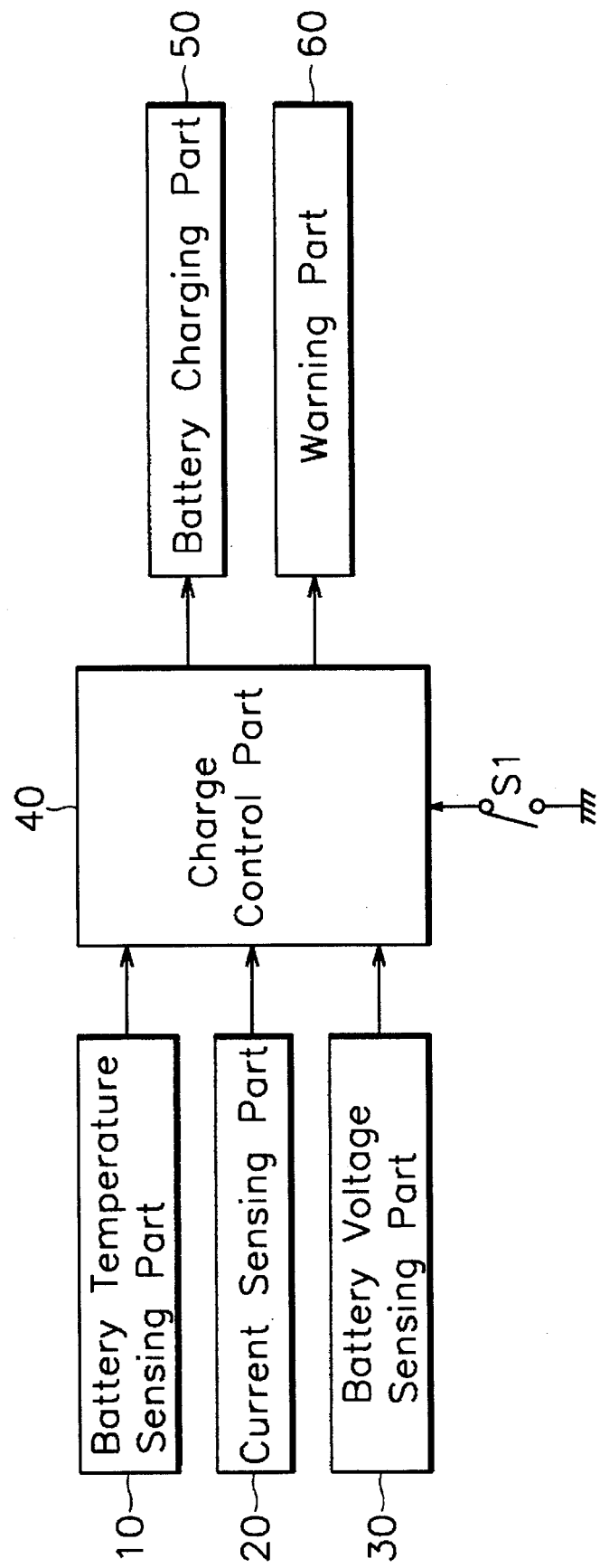
FIG. 1 is a block diagram showing a controlling device for charging a battery for an electric vehicle.

FIG. 1 is a block diagram showing a controlling device for charging a battery for an electric vehicle.

Referring to FIG. 1, the controlling device for charging a battery for an electric vehicle includes a battery temperature sensing part 10 sensing the battery temperature in accordance with charging of the battery, a current sensing part 20 for sensing the current in charging/discharging of the battery, a battery voltage sensing part 30 for sensing the battery voltage, a charging mode switch S1 determining a charging mode, a charge control part 40 connected to the output terminals of the above sensing parts 10, 20, and 30 for controlling a charging drive signal as a result of checking the full-charging state of the battery, a battery charging part 50 connected to the output terminal of the charge control part 40 and a warning part 60.

A lead-acid battery serves as the battery of the electric vehicle in accordance with the preferred embodiment of the present invention. However, the battery is not limited to being a lead-acid battery.

The operation of the battery charge in accordance with the embodiment of the present invention will be explained with reference to the accompanying drawings.

When power is applied to the vehicle, the charge control part 40 initializes all operation circuits and variables (S110), and senses a predetermined charging mode (S120).

As described above, as to the battery charging mode, there are a constant current charging method and a constant current/constant voltage charging method. The predetermined charging mode is sensed by the operation of the charging mode switch S1.

If the predetermined charging mode is the constant current charging method, a temperature cut-off (TCO) method, a voltage drop method and a flat time limiting method are used to sense the full-charging state of the battery. If the predetermined charging mode is the constant current/constant voltage method, the temperature cut-off (TCO) method and a current limit method are used. After determining the predetermined charging method (S130), when the predetermined charging mode is the constant current/constant voltage method, the charge control part 40 checks (S140) the battery temperature Ti in order to sense the full-charging state of the battery in accordance with the temperature cut-off (TCO).

The battery temperature sensing part 10 is formed with a thermocouple and produces the corresponding electric signal to the charge control part 40 by producing the electromotive force in response to temperature.

The charge control part 40 obtains the battery temperature Ti sampled as a result of a signal from the battery temperature sensing part 10 and determines (S150) the relation with the predetermined charging suspension temperature Tc.

In the above step, it is determined (S150) whether the present sampled battery temperature Ti is above the charging suspension temperature Tc. When the battery temperature Ti is below the charging suspension temperature Tc, it is determined (S160) whether the battery temperature Ti is below a limit battery temperature T1 during charging.

In the above step, when the present battery temperature Ti is below the charging suspension temperature Tc and is above the limit battery temperature T1, the charge control part 40 determines the present battery charging state as the limit charging state instead of the full-charging state and then warns of the limit (S170) by actuating the warning part 60.

In the above step, when the present battery temperature Ti is above the charging limit temperature Tc, the charge control part 40 finishes charging (S370) by determining that the battery charging is finished and stopping the operation of the battery charging part 50.

When the present battery temperature Ti is below the limit battery temperature T1, the charge control part 40 senses (S180) a charging current I in order to determine the full-charging state of the battery in accordance with the current limit method.

After converting the constant current charging into the constant voltage charging, the relation between the sensed charging current I and the predetermined charging limit current Is is determined (S190) so as to determine whether the charging current is below the predetermined value.

When the sensed charging current I is above the charging limit current Is, the battery temperature is rechecked. When the sensed charging current I is below the charging limit current Is, the charge control part 40 finishes the full-charging sensing routine according to the constant voltage/ constant current charging method after stopping (S350) the operation of the battery charging part 50 by determining the full-charging state in which the current is reduced below the predetermined value as a result of converting into the constant voltage charging.

When the above battery charging mode is the constant current method, the charge control part 40 senses (S200 to S230) the full-charging state of the battery in accordance with the temperature cut-off method as described above.

Figure 2A:
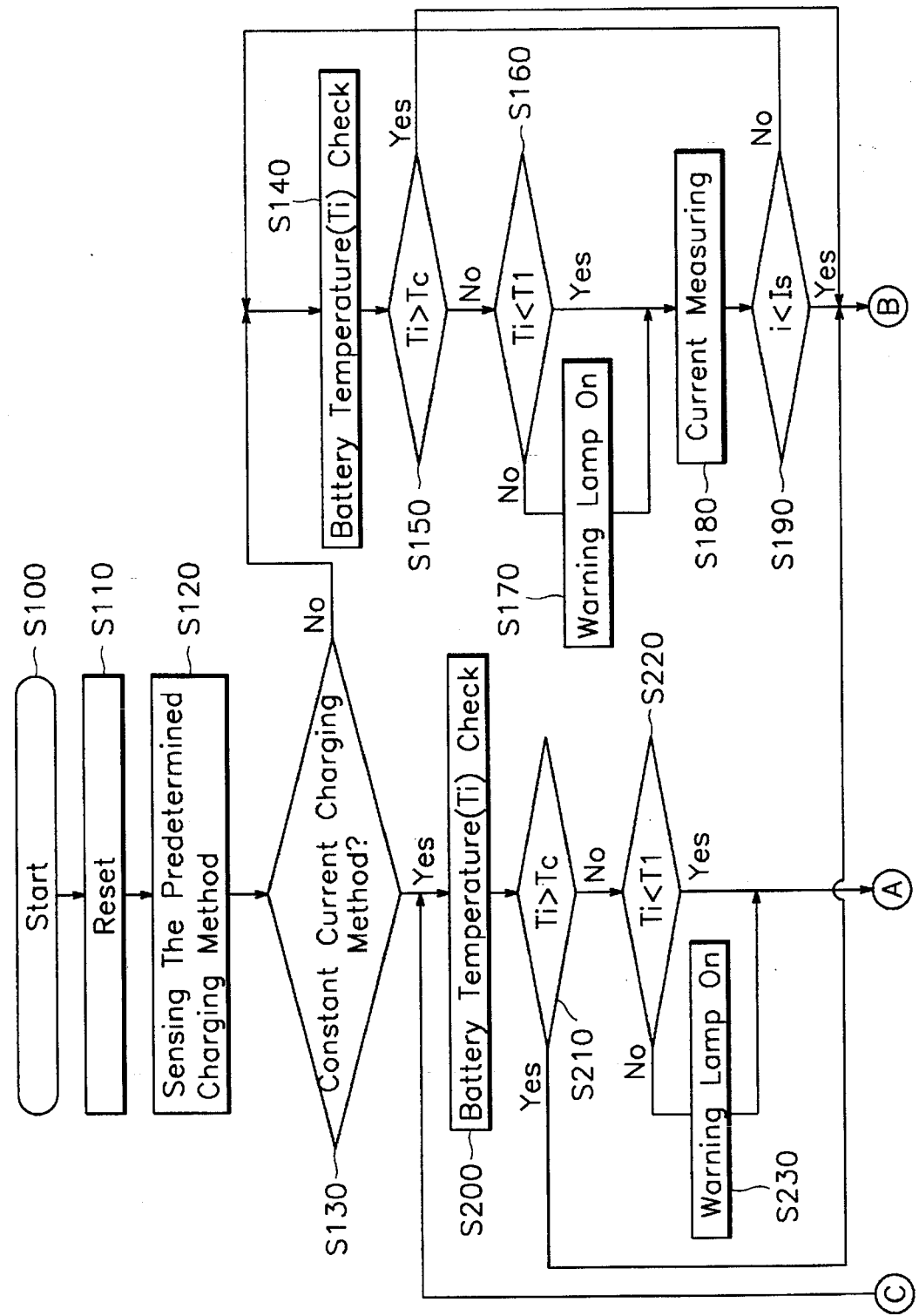
FIGS. 2A and 2B are operating flow charts of the controlling methods for charging a battery for an electric vehicle in accordance with the preferred embodiment of the present invention.
Figure 2B:
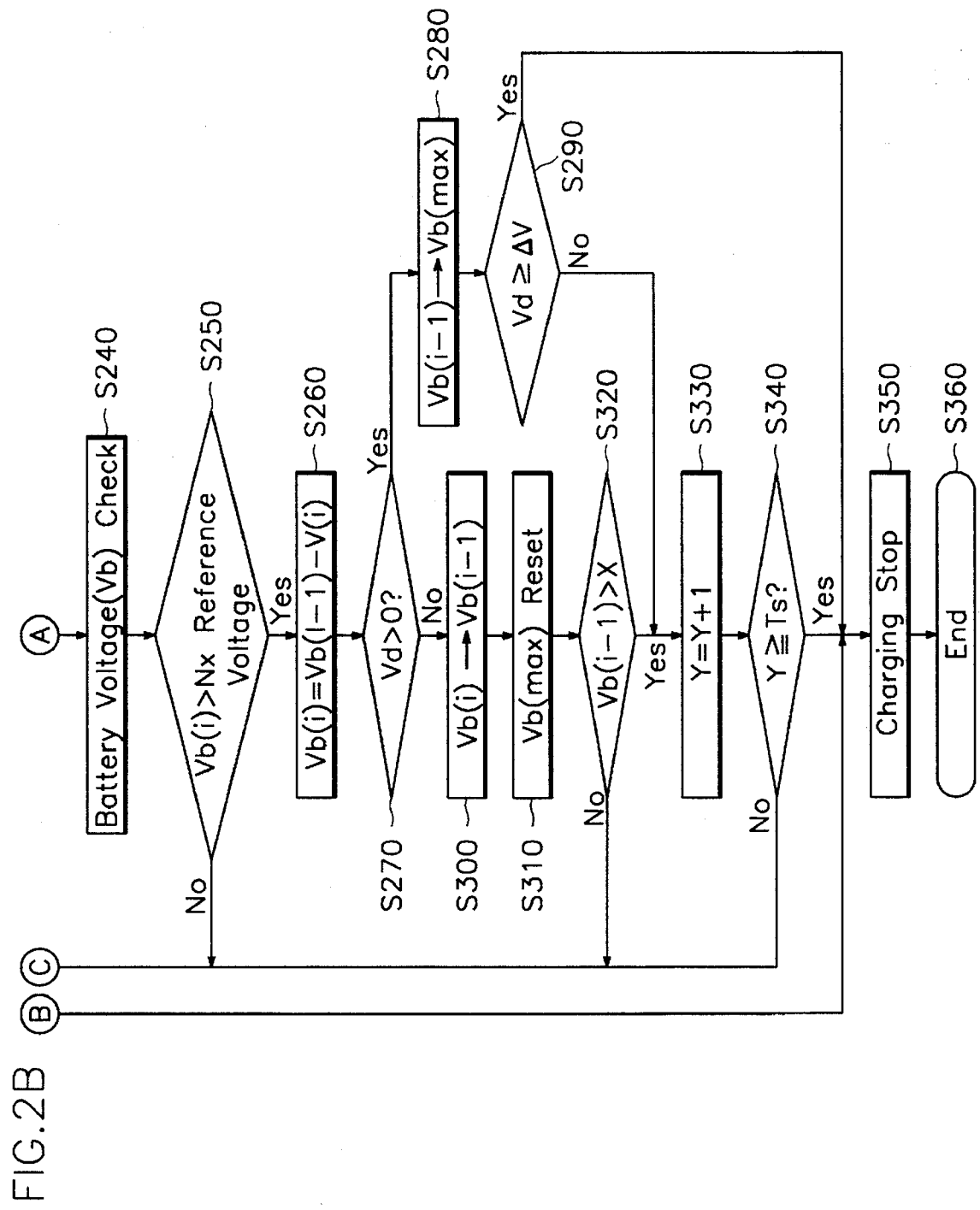

When the full-charging state is not sensed in accordance with the temperature cut-off method, the voltage drop method is used as shown in FIG. 2B.

In order to sense the full-charging state in accordance with the voltage drop method, the charge control part 40 checks (S240) the battery voltage Vb.

The battery voltage sensing part 30 senses the present charged battery voltage state and produces the corresponding electric signal to the charge control part 40.

After the charge control part 40 senses the present charging voltage, it determines (S250) the relationship between the voltage value multiplying the predetermined full-charging approaching voltage by the number of the battery and the measured charging voltage.

When the present battery charging voltage is in the full-charging section, a voltage drop value Vd is obtained (S260) by subtracting the measured charging voltage Vb (i) of the present step from the charging voltage Vb (i-1) measured in the former routine.

When the present battery charging voltage is not in the full-charging section, the battery temperature is rechecked.

After obtaining the voltage drop value Vd in the full-charging state, it is determined (S270) whether the measured voltage drop value is above zero. When the measured voltage drop value Vd is above zero, the battery voltage Vb (i-1) measured in the former routine is set to be the maximum battery voltage Vmax, and it is determined (S290) whether the voltage drop value Vd is greater than or equal to a predetermined value.

When the above voltage drop value Vd is above the predetermined voltage drop value (- V), the charge control part 40 stops (S350) the operation of the battery charging part 50. When the above voltage drop value Vd is below the predetermined value, the flat time limiting method is used.

When the calculated voltage drop value is below zero, the charge control part 40 determines that the voltage drop in accordance with the full-charging does not occur and it determines whether the voltage riffle phenomenon occurs.

In the full-charging state, the riffle phenomenon may continuously arise without the voltage drop occurring as a result of the battery gas. In order to determine whether the riffle phenomenon arises, the charge control part 40 determines the present measured charging voltage Vb as the charging voltage Vb (i-1) measured in the former routine and resets the maximum battery voltage Vmax (S300 to S310).

After resetting the maximum battery voltage Vmax, the charge control part 40 determines (S320) the relation between the predetermined charging voltage Vb (i-1) and the average battery voltage X when the battery is fully charged/overcharged. When the above charging voltage Vb (i-1) is below the average battery voltage X, the charge control part 40 determines that there is no riffle and rechecks the battery temperature.

When the above charging voltage Vb (i-1) is above the average battery voltage X, the charge control part 40 determines that there is a riffle phenomenon. Therefore, the flat time limiting method is used in order to determine the full-charging state of the battery.

After adding +1 to a variable Y measuring the charging limit time, the charge control part 40 determines (S340) the relationship between the above variable and the charging time limit value Ts in case the voltage drop does not come about near the full-charging.

When the measured time Y is below the charging time limit value Ts, the charge control part 40 rechecks the battery temperature and carries out the temperature cut-off (TCO) method. When the measured time Y is above the charging time limit value Ts, the charge control part 40 finishes charging and then closes the routine (S350 to S360) by stopping the operation of the battery charging part 50.

As described above, the present invention provides a controlling device and a method for charging the battery for the electric vehicle that may accurately sense the full-charging state of the battery by using all methods capable of sensing the full-charging state in accordance with the battery charging method and improve the battery consumption ratio and its stability.

What is claimed is:

1. A method for controlling charging of a battery, comprising:

(a) sensing a predetermined charging mode of said battery;

(b) detecting a temperature of said battery;

(c) determining whether charging of said battery is complete based on said detected temperature;

(d) detecting a charging current of said battery if said step (c) does not determine that charging of said battery is complete and said step (a) senses a first charging mode;

(e) determining whether charging of said battery is complete based on said detected current when said step (c) does not determine that charging of said battery is complete and said step (a) senses said first charging mode;

(f) detecting a voltage of said battery if said step (c) does not determine that charging of said battery is complete and said step (a) senses a second charging mode; and (g) determining whether charging of said battery is complete based on said detected voltage when said step (c) does not determine that charging of said battery is complete and said step (a) senses said second charging mode; and (h) controlling a battery charging operation based on a determination made in one of said steps (c), (e) and (g).

2. The method of claim 1, wherein said step (c) comprises:

(c1) comparing said detected temperature to a first temperature threshold; and (c2) determining that charging of said battery is complete based on a result of said comparing in step (c1).

3. The method of claim 2, wherein said step (c) further comprises:

(c3) comparing said detected temperature to a second temperature threshold if said step (c2) does not determine that charging of said battery is complete; and (c4) turning on a limit charging state warning lamp based on a result of said comparing in step (c3).

4. The method of claim 1, wherein said step (e) comprises:

(e1) comparing said detected current to a current threshold; and (e2) determining that charging of said battery is complete based on a result of said comparing in step (e1).

5. The method of claim 4, wherein said step (e) further comprises:

(e3) returning to step (b) if said step (e2) does not determine that charging of said battery is complete.

6. The method of claim 1, wherein said step (g) comprises:

(g1) determining a voltage drop value based on said detected voltage and at least one previously detected voltage;

(g2) determining that charging of said battery is complete based on said voltage drop value.

7. The method of claim 6, wherein said step (g) further comprises:

(g3) calculating a battery charging time;

(g4) comparing said battery charging time to a charging time threshold if said step (g2) does not determine that charging of said battery is complete; and (g5) determining that charging of said battery is complete based on a result of said comparing in said step (g4).

8. The method of claim 7, wherein said step (g) further comprises:

(g6) returning to said step (b) if said step (g5) does not determine that charging of said battery is complete.

9. The method of claim 6, wherein said step (g2) determines that charging of said battery is complete if said voltage drop value exceeds a predetermined voltage drop threshold.

10. The method of claim 6, wherein said step (g) further comprising:

(g3) determining whether voltage riffle is occurring in said detected voltage if said detected voltage is less than or equal to a predetermined voltage threshold; and (g4) returning to said step (b) if said step (g3) determines that said voltage riffle is not occurring.

11. The method of claim 10, wherein said step (g) further comprises:

(g5) calculating a battery charging time;

(g6) comparing said battery charging time to a charging time threshold if said step (g3) determines that said voltage riffle is occurring; and (g7) determining that charging of said battery is complete based on a result of said comparing in said step (g6).

12. The method of claim 11, wherein said step (g3) further comprises:

(g8) returning to said step (b) if said step (g7) does not determine that charging of said battery is complete.

13. The method of claim 10, wherein said step (g3) compares said detected voltage to an average battery voltage, said average battery voltage being an average of voltages when said battery is one of fully charged and overcharged to determine if said voltage riffle is occurring.

14. The method of claim 1, further comprising:

(h) turning on a dangerous charge state warning lamp if said detected temperature falls within a predetermined temperature range.

15. An apparatus for controlling charging of a battery, comprising:

mode sensing means for sensing a predetermined charging mode of said battery;

temperature detecting means for detecting a temperature of said battery;

current detecting means for detecting a charging current of said battery;

voltage detecting means for detecting a voltage of said battery;

first means for determining whether charging of said battery is complete based on said detected temperature;

second means for determining whether charging of said battery is complete based on said detected current when said first means does not determine that charging of said battery is complete and said mode sensing means senses a first charging mode;

third means for determining whether charging of said battery is complete based on said detected voltage when said first means does not determine that charging of said battery is complete and said mode sensing means senses said second charging mode; and control means for controlling a battery charging operation based on output from said first, second and third means.

16. The apparatus of claim 15, wherein said first means first compares said detected temperature to a first temperature threshold, and first determines that charging of said battery is complete based on a result of said first comparison.

17. The apparatus of claim 16, further comprising:

a warning lamp; and wherein said first means second compares said detected temperature to a second temperature threshold if said first means does not determine that charging of said battery is complete based on said first comparison, and turns on said warning lamp based on a result of said second comparison.

18. The apparatus of claim 15, wherein said second means compares said detected current to a current threshold, and determines that charging of said battery is complete based on a result of said comparison.

19. The apparatus of claim 18, wherein said first means determines whether charging of said battery is complete based on a newly detected temperature if said second means does not determine that charging of said battery is complete.

20. The apparatus of claim 15, wherein said third means determines a voltage drop value based on said detected voltage and at least one previously detected voltage, and determines that charging of said battery is complete based on said voltage drop value.

21. The apparatus of claim 20, wherein said third means calculates a battery charging time, compares said battery charging time to a charging time threshold if said third means does not determine that charging of said battery is complete based on said voltage drop value, and determines that charging of said battery is complete based on a result of said comparison.

22. The apparatus of claim 21, wherein said first means determines whether charging of said battery is complete based on a newly detected temperature if said third means does not determine that charging of said battery is complete based on said comparison.

23. The apparatus of claim 20, wherein said third means determines that charging of said battery is complete if said voltage drop value exceeds a predetermined voltage drop threshold.

24. The apparatus of claim 20, wherein said third means determining whether voltage riffle is occurring in said detected voltage if said detected voltage is less than or equal to a predetermined voltage threshold, and said first means determines whether charging of said battery is complete based on a newly detected temperature if said third means does not determine that said voltage riffle is occurring.

25. The apparatus of claim 24, wherein said third means calculates a battery charging time, compares said battery charging time to a charging time threshold if said third means determines that said voltage riffle is occurring, and determines that charging of said battery is complete based on a result of said comparison between said battery charging time and said charging time threshold.

26. The apparatus of claim 25, wherein said first means determines whether charging of said battery is complete based on a newly detected temperature if said third means does not determine that charging of said battery is complete based on said comparison between said battery charging time and said charging time threshold.

27. The apparatus of claim 24, wherein said third means compares said detected voltage to an average battery voltage, said average battery voltage being an average of voltages when said battery is one of fully charged and overcharged to determine if said voltage riffle occurs.

28. The apparatus of claim 15, further comprising:

a dangerous charge state warning lamp; and means for turning on said dangerous charge state warning lamp if said detected temperature falls within a predetermined temperature range.

* * * * *